US012607218B2

(12) United States Patent
Heineke et al.

(10) Patent No.: US 12,607,218 B2
(45) Date of Patent: Apr. 21, 2026

(54) COMPONENT HOLDER

(71) Applicant: SFS Group International AG,
Heerbrugg/St. Gallen (CH)

(72) Inventors: Kai Heineke, Bad Teinach/Zavelstein
(DE); Olav Schendel, Stuttgart (DE)

(73) Assignee: SFS Group International AG,
Heerbrugg/St. Gallen (CH)

( * ) Notice: Subject to any disclaimer, the term of this
patent is extended or adjusted under 35
U.S.C. 154(b) by 347 days.

(21) Appl. No.: 18/206,679

(22) Filed: Jun. 7, 2023

(65) Prior Publication Data

US 2024/0151256 A1 May 9, 2024

(30) Foreign Application Priority Data

Jun. 9, 2022 (EP) ..................................... 22178169

(51) Int. Cl.
*F16B 5/06* (2006.01)
*F16B 19/10* (2006.01)

(52) U.S. Cl.
CPC .......... *F16B 19/1027* (2013.01); *F16B 5/065*
(2013.01)

(58) Field of Classification Search
CPC .... F16B 5/065; F16B 5/0657; F16B 15/0007;
F16B 21/082; Y10T 24/38; Y10T 24/45;
Y10T 24/45225; Y10T 24/45471
USPC ......... 411/388, 389; 52/843, 844; 40/607.13
See application file for complete search history.

(56) References Cited

U.S. PATENT DOCUMENTS

| | | | | |
|---|---|---|---|---|
| 2,312,185 | A * | 2/1943 | Neunherz | .............. A47D 9/012 |
| | | | | 5/100 |
| 5,833,416 | A * | 11/1998 | Cau | ......................... F16B 21/02 |
| | | | | 296/146.7 |
| 7,584,582 | B1 | 9/2009 | Hutter, III | |
| 10,989,239 | B2 * | 4/2021 | Rassam | ................. F16B 5/0657 |
| 11,767,872 | B2 * | 9/2023 | Beyer | ................... F16B 19/004 |
| | | | | 29/525.03 |
| 2013/0034406 | A1 | 2/2013 | Wu | |
| 2020/0263728 | A1 | 8/2020 | Balcerzak et al. | |

FOREIGN PATENT DOCUMENTS

| | | |
|---|---|---|
| CN | 109649635 A | 4/2019 |
| WO | 2016146716 A1 | 9/2016 |

* cited by examiner

*Primary Examiner* — Flemming Saether
(74) *Attorney, Agent, or Firm* — Volpe Koenig

(57) ABSTRACT

A component holder, in particular for aircraft, for indirectly
securing components to the fuselage or body shell. The
component holder has a base portion and an attachment
element which is lockable to the base portion and has a
component receiving member arranged thereon. The base
portion has a circular shell form, and the upper edge has
retention and locking elements. The lockable attachment
element has a s dome-like basic structure, and the lower
edge region has retention and locking elements which
complement those of the base portion and are lockable
therewith. The component receiving member is formed
integrally on the attachment element and arranged at a dome
zenith on the outer side. The dome is formed from at least
three frames which are angularly offset on the circumfer-
ence. The frames extend from the dome lower edge region
to the base location of the component receiving member at
the dome zenith.

11 Claims, 3 Drawing Sheets

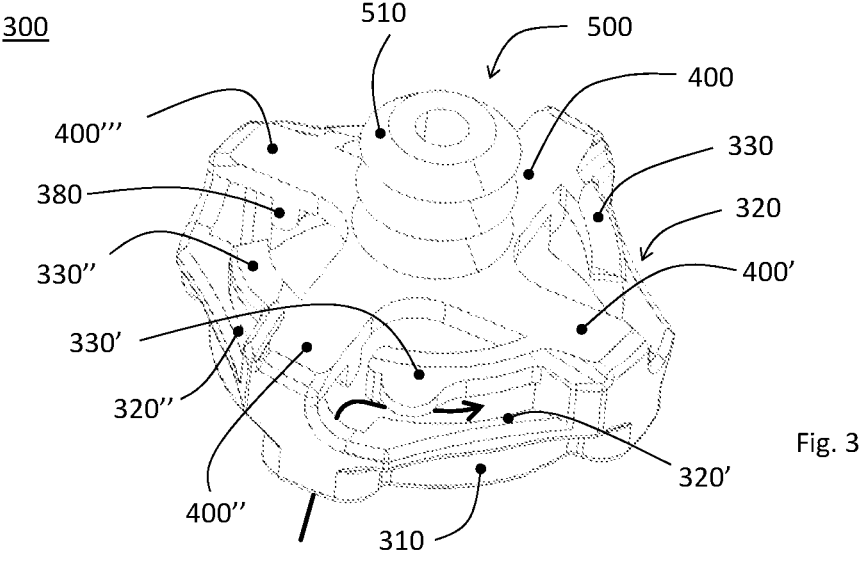
Fig. 3
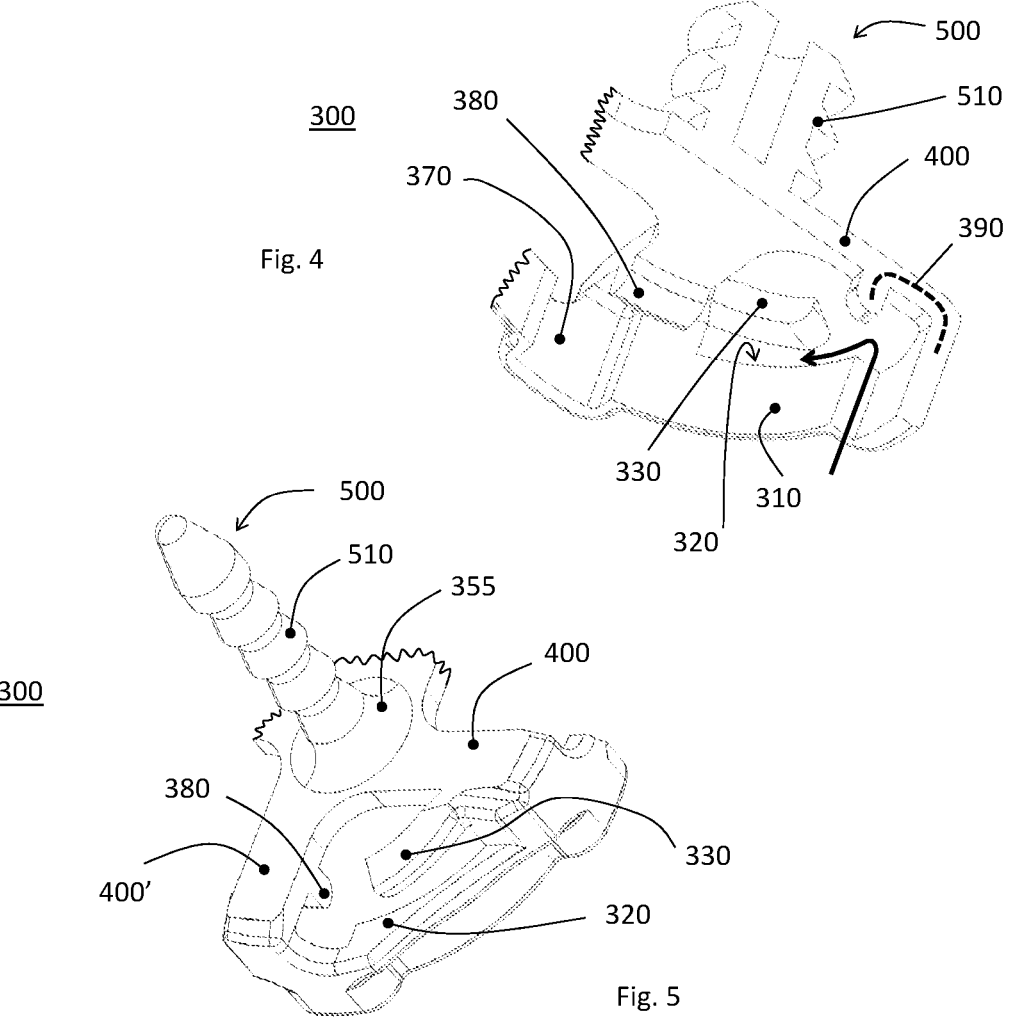
Fig. 4
Fig. 5

COMPONENT HOLDER

CROSS-REFERENCE TO RELATED APPLICATIONS

This application claims priority from European Patent Application No. 22178169.3, filed Jun. 9, 2022, which is incorporated herein by reference as if fully set forth.

TECHNICAL FIELD

The present invention relates to a component holder which is preferably configured for use in an aircraft, but in a similar function can also be used in land vehicles. The component holder is particularly useful for securing insulation material or insulation mats on inner walls of such vehicles.

BACKGROUND

In vehicle construction, in particular in aircraft and in rail vehicles, the internal devices are fitted after the production of the fuselage or the body shell as pre-assembled elements. Between the outer shell of the vehicle and the pre-suspended walls cable paths, media lines and pieces of insulation may be installed. In particular for thermal insulation and noise damping, extensive mats are fitted to the inner side of the outer wall and are generally secured in a point-like manner rather than extensively. This facilitates the assembly and subsequent replacement. It is known in this instance to fit individual component holders at specific locations provided structurally for this purpose. It will, for example, be possible to fit insulation mats but also cable harnesses or other components on these. A component holder thus forms a type of anchor location or interface for the mechanical securing of a component to an underlying surface, such as the carrier structure of a vehicle.

PRIOR ART

In order to avoid the disadvantage of additional holes in particular in the carrier structure of aircraft, in the prior art a large number of specific shaped sheet metal components, such as angled members, double-angled members, Z-angled members or flaps which were fitted at one of the structural ends thereof, preferably at rivet locations which are already provided, were provided. The other end of the shaped sheet metal component has in this instance a securing location which carries the insulation mats. It is thereby particularly possible for a specific distance to be able to be achieved between the inner surface of the fuselage and the insulation mat (or the component which is intended to be secured). This can be adjusted by means of the sizing of the above-mentioned shaped sheet metal components. The disadvantage in this instance is that a large number of extremely different shaped sheet metal components have to be stored in order to achieve the described flexibility.

SUMMARY

An object of the invention is to provide, in place of a single-piece shaped sheet metal component a modular component holder which carries on the advantages of the prior art but avoids the complexity of the shaped sheet metal components.

Such a component holder is constructed in a modular manner and comprises a base portion and an attachment element which can be locked to the base portion and which has a component receiving member which is arranged thereon.

The base portion is provided for securing to the carrier structure of the vehicle and is also first fitted individually to the starting point thereof provided for this purpose. The appropriate attachment element may be connected at a later time to the base portion by means of locking. In particular for this type of locking, no additional securing means such as pins, fasteners or adhesive bonding are required. The term "locking" is intended to be understood to refer to connections such as bayonet closures, screw closures, snap-fitting and locking connections and clips. Preferably, a locking in the manner of a bayonet closure is provided.

The mechanical interface, that is to say, the type and sizing of the locking elements are in the predetermined base portion identical for all the attachment elements. Consequently, differently configured base portions can depending on use (e.g. on the carrier structure of an aircraft fuselage or on walls, edges or on frames) be connected to an attachment element from a very large number of different variants. In this instance, the term "different" refers both to the structural height, structural form and the type of component receiving member. The mechanical interface remains identical in each case.

To this end, the base portion has a substantially shell-like, circular basic shape, wherein the upper edge of this shell has the retention and locking elements. The term "upper" in this instance is intended to be understood to mean the—in the installed state—free end with the interface, the lower end would correspond to the connection plane or face with a wall or substructure. A base portion is preferably produced from plastics material by means of injection-molding. However, an embodiment made of metal such as aluminum by means of deep-drawing, pressing and punching is also conceivable. A combination is also possible, as a metal component over-molded with plastics material.

The lockable attachment element has a substantially dome-like basic structure. Dome-like or dome is intended in this instance to be understood to mean a substantially half-shell-like basic shape with a lower closed ring as an edge and a curvature which bridges this edge. In this instance, this curvature does not have to be constructed as a perfect closed spherical shell, it may also be constructed from ribs or frames or facet faces. The height of the dome, that is to say, the spacing of the zenith of the dome on the plane defined by the edge may vary depending on the task and application of the component holder and is an inventive advantage.

The lower edge region of the dome has in this instance retention and locking elements which are configured to mechanically and functionally complement those of the base portion and can cooperate therewith in a locking manner. In the context of the statements just made, this lower edge accordingly forms the supplement to the mechanical interface of the base portion. The upper edge of the shell and the lower edge of the dome thus cooperate during locking.

It should be emphasized that the embodiment as a "shell with an attachable lockable dome" affords some specific advantages with respect to the prior art. The force dissipation from the component receiving member into the underlying surface (inner wall, substructure) is carried out in contrast to a central locking, for example, via a mandrel, in this instance via the edges of the dome and shell. Tensile and compressive stresses and tilting moments are distributed and dissipated equally well in all directions. The material selection and configuration of the component receiving member or the dome can be selectively configured to be resilient as well as rigid.

The component receiving member is formed integrally on the attachment element and provides the mechanical connection between the attachment element and the component of the vehicle which is intended to be mounted.

The integral connection promotes the force introduction from the component receiving member into the dome. In particular, the component receiving member will be arranged at the zenith of the dome at the outer side and will consequently face away from the dome, perpendicularly to the plane which is defined by the lower edge region of the attachment element.

In order to ensure the above-described symmetrical force dissipation, the dome may be formed from at least three frames which are offset at an angle on the circumference. The term "frames" are in this instance intended to be understood to be webs with a, for example, round, rectangular or tubular or U-shaped cross section. These frames extend from the lower edge region of the dome to the base location of the component receiving member at the zenith of the dome. The term "zenith" is in this instance intended to be understood to be the apex of the dome; at the outer side of the dome, the base location of the component receiving member is located at the apex.

In a particularly preferred manner, the dome is formed from four frames which are each offset through 90° (at the circumference). This configuration has been found to be advantageous with respect to torsional rigidity and material consumption.

The construction with frames between the lower edge of the dome and the apex/zenith thereof leaves behind depending on the width of the frames regions or faces between adjacent frames and the lower edge region of the dome which have a substantially curved triangular form. These areas may be in the form of material-free apertures. Material and weight are thereby saved without impairing the structural strength. Naturally, a type of thin membrane may also be provided in these areas should this be technically required.

Advantageously, the attachment element will be in the form of an injection-molded element made of plastics material. As is conventional for the person skilled in the art, the properties of a plastics material can nowadays be adjusted within wide limits. As a result of additives, properties such as (low-temperature) toughness, resistance to solvents or fire-resistance can be influenced. In particular, additives such as glass or carbon fibers permit highly resistant embodiments of attachment elements. Examples of such plastics materials are PEEK, PPS and PEI.

Preferably, the base of the shell or the base portion will have a central circular opening which enables the passage of a fastener with which the base portion is secured to an inner wall or substructure. In order to further increase the modularity of the system, there may be provision for the base portion to have in the base of the shell a centrally arranged receiving opening for an adapter ring, Consequently, a shell may alternatively be provided with different adapter rings, which enables the use with a large number of differently sized fasteners. In addition, the adapter ring may be in the form of an insulating component which can be inserted in a positive-locking manner into the receiving opening. In a particularly preferred manner, the adapter ring is retained in the receiving opening by means of a clamping fit. This loss prevention mechanism increases the handling reliability.

Depending on the configuration, the adapter rings may also have tubular elements (for guiding a fastener) or also sealing elements, ribs or other functional elements.

What has been described above shows that, as a result of the shell/dome principle in the assembled state of the base portion, attachment element and adapter ring, a common interior with a common inner space is formed. It surrounds in the manner of a cage the head of a fastener for the base portion. On the one hand, the head of the fastener is thereby protected, but also, for example, the insulation mats which are intended to be introduced. The dome shape enables the mat or a secured component to have a rounded support face in the assembled state.

The actual component receiving member at the outer side of the attachment element is specifically in the form in the insulation mats of a mandrel with a plurality of locking elements which are arranged in an annular manner on the shaft. The insulation mats for aircraft are in most cases pre-fabricated, flexible, planar mats and carry at the provided securing locations lugs for inserting mandrels of the type described. The (releasable) securing is then carried out by means of rings which are pushed over the mandrels and engage with a locking element. Alternatively, the lug may itself cooperate with the locking elements. The length of the mandrel varies depending on the thickness and the type of insulation mat (thermal or electrical insulation and/or acoustic absorption layer).

Alternatively, a component receiving member may also be in the form of a lug, a screw element with an outer thread, a nut element with an inner thread, a clamp or adhesive location, a cable holder, a pipe or line guide.

BRIEF DESCRIPTION OF THE DRAWINGS

FIG. 3 shows a first embodiment of an attachment element as an oblique plan view, FIG. 4 shows a second embodiment of an attachment element with omissions, FIG. 5 shows a part cross section through the first embodiment with some omissions.

DETAILED DESCRIPTION

The Figures show various embodiments of the base portion 100 and attachment elements 300 which together form the basic configuration of a component holder.

The features of FIGS. 3 to 7 are functionally identical, but are shown structurally as different variants and perspectives. In order to avoid repetition, reference will be made only to the relevant differences.

Figure 1:
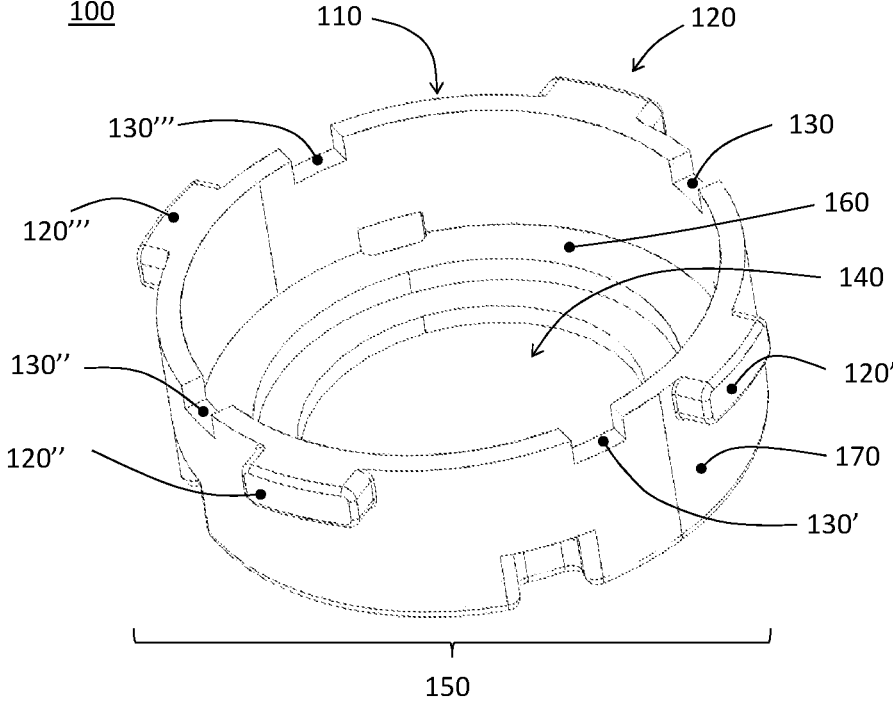
FIG. 1 shows the base portion of a component holder.

FIG. 1 shows a base portion 100 having a shell-like base structure. In the embodiment shown, the shell 150 comprises a planar base 160 and a cylindrical side wall 170. The base 160 has a (in this instance, stepped) receiving opening 140 for an adapter ring 600. The upper edge 110 of the shell 150 or the base portion 100 is in this instance shown with four retention elements 120, 120', . . . and locking elements 130, 130', . . . in each case. They are arranged in each case in pairs one behind the other on the circumference and form a first portion of four locking units of a bayonet closure. The retention elements 120, 120', . . . are illustrated as radially outwardly protruding journals. The locking elements 130 are shown as rectangular incisions in the upper closure edge 110 of the side wall 170. The cooperation with an attachment element 300 is explained in greater detail below.

Figure 2:
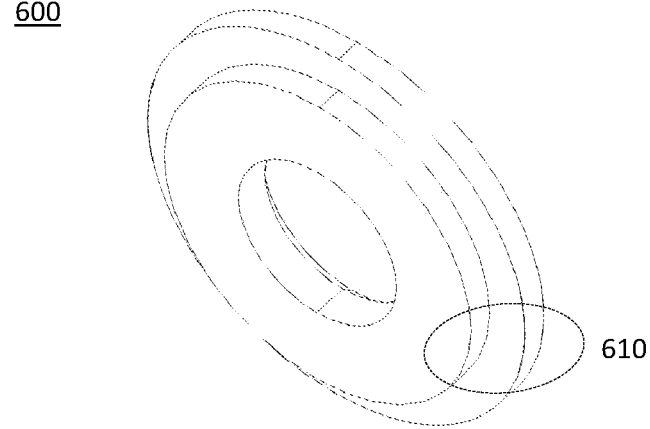
FIG. 2 shows by way of example an adapter ring.

FIG. 2 shows an adapter ring 600 for inserting in the receiving opening 140 of a base portion 100. It is illustrated with a stepped portion 610 which enables a precise centering and improved load distribution in a receiving opening, as shown in FIG. 1.

FIG. 3 shows the first embodiment of an attachment element in a view obliquely from above. From the top to the bottom, the component receiving member 500 which is in the form of a short mandrel with three annular locking elements 510 can be seen. The component receiving member merges into the zenith of the dome which is formed in this instance from four frames 400, 400' to 400'''. The shape of the dome is in this instance set out as quite a flat hood. The frames 400 to 400''' open in a common edge region 310 which forms the lower closure of the attachment element 300. The upper edge of the edge region is configured in a complex manner and provides various stop faces which act in this instance as retention elements 330. Locking tongues perform the function of the locking elements 320 . . . 320'''.

The locking tongues and stop faces are the functional partners of the protruding journals (retention elements 120) and incisions (locking element 120) in the base portion 100 according to FIG. 1.

The thick arrow in FIGS. 3 and 4 describes the movement sequence of the joining of the attachment element 300 and base portion 100. It can be better understood with reference to FIG. 4.

In FIG. 4, only a quarter of an attachment element 300 is shown in a view obliquely from below. The thick arrow helps to understand the cooperation of the retention and locking elements 120, 130, 320, 330 ( . . . ). The lower edge 310 of the attachment element 300 also has as many guiding slots 370 as the associated base portion 100 has retention elements 120 (journals). The guiding slots 370 are in this instance illustrated as radially outwardly facing recesses in the lower edge region 310 of the dome; the width and depth are selected to be slightly larger than the dimensions of the journals (retention elements 120) of the base portion. The orientation of the guiding slots 370 is vertical, with respect to the plane defined by the edge region 310 of the attachment element 300.

The smallest inner diameter of the edge region 310 is selected to be slightly larger than the diameter of the shell 150 on the upper edge 110 (measured without the journals/retention elements 120, . . . ) so that the attachment element 300 can be pushed onto the base portion in a fitting manner. On the inner side of the dome, a U-shaped groove 390 is formed from a guiding strip 350, in this instance in the form of part of the frame 400, the portion of the frame 400 close to the edge and the upper region of the edge 310. In the installed state, the upper edge 110 of the base portion 100 stops against this groove 390, the groove thus acts as a depth limitation during assembly. In this position, the journal (retention element 120, not shown in FIG. 4) can be pushed by means of a rotational movement further in the direction of the arrow over the edge 310 of the attachment element 300. This upper closure of the edge 310 consequently forms the retention element 320 for the journal (retention element 120 of the base portion 100). At the same time, the locking element 330 which is in the form of a resilient finger slides over the upper edge 110 of the base portion 100 until it can engage in a recess (locking element 130) and consequently fixes the relative position of the attachment element 300 and base portion 110 and prevents an independent release. Depending on the configuration of the attachment element and selection of the locking, the configuration may be carried out in a similar manner or differently. The advantages achieved in the present invention are a tool-free assembly and a self-securing locking. Depending on the task, it can be produced as a releasable or non-releasable locking. The preferred method in this instance is a bayonet closure with the described elements.

In FIG. 3, the locking element 330' is provided with a small semi-circular flap. This enables this locking to be released by means of lifting.

FIG. 5 shows an attachment element the dome of which takes on the shape of FIGS. 3 and 4 but has a different component receiving member 500. The mandrel is configured to be slimmer and the base location 350 thereof merges in a cup-like manner into the zenith of the dome. The locking elements on the mandrel are configured to be flatter. This embodiment is recommended in particular with a slightly more resilient mandrel/component receiving manner 500 since the cup base improves the introduction of forces into the dome. The locking elements and frame arrangement correspond to FIGS. 3 and 4 as does the functionality.

Figure 6:
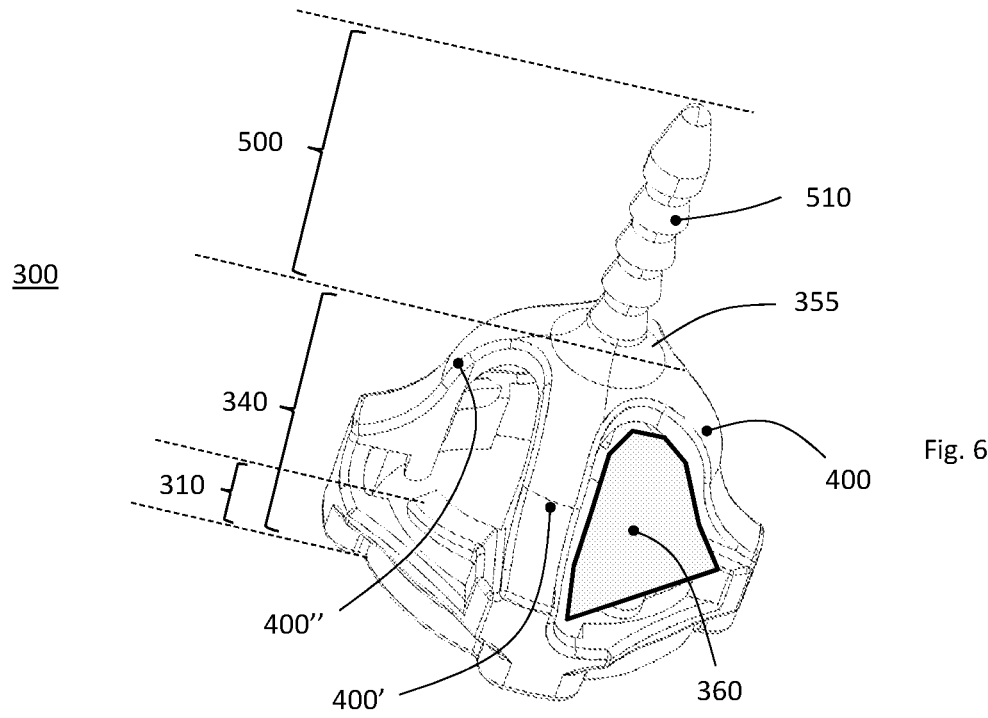
FIG. 6 shows a third embodiment as an oblique view.

FIG. 6 shows an attachment element 300 with a more powerfully curved dome 340 than FIGS. 3-5. The frames 400, 400', etc., have a shape which is reminiscent of an S-shaped curve and merge at the base location 355 of the component receiving member 500. In this Figure, the face 360 which describes the areas between two adjacent frames 400, 400' and the lower edge 310 was also schematically marked. The area is curved in a similar manner to the S-shape of the frames 400 with a rounded tip close to the base location 355.

Figure 7:
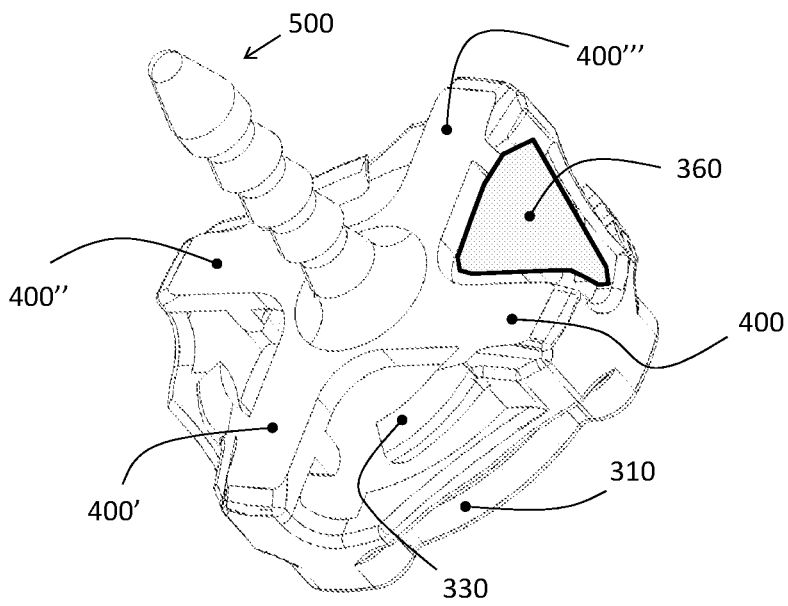
FIG. 7 shows the second embodiment as an oblique view with details.

In FIG. 7, the area 360 is more powerfully compressed as a result of the flatter dome (i.e. having a cup-shaped basic structure) of the attachment element 300 (similar to FIG. 5).

For the person skilled in the art, in a manner encouraged by the Figures and the description, other equivalent embodiments are derived, in particular during the configuration of the dome. These are also included in principle by the described principle.

The invention claimed is:
1. A component holder, comprising:
a base portion;
an attachment element which is lockable to the base portion and which has a component receiving member arranged thereon;
the base portion has a substantially shell-shaped, circular basic shape, and an upper edge of the shell-shaped, circular basic shape has retention and locking elements; and
the lockable attachment element has a substantially dome-shaped or cup-shaped basic structure, and a lower edge region of the dome-shaped or cup-shaped basic structure has retention and locking elements which are configured to mechanically and functionally complement the retention and locking elements of the base portion and cooperate therewith in a locking manner;
the component receiving member is formed integrally on the attachment element;
the dome-shaped or cup-shaped basic structure is formed from at last three frames which are offset at an angle on a circumference, and the frames extend from the lower edge region of the dome-shaped or cup-shaped basic structure to a base location of the component receiving member at a top of the dome-shaped or cup-shaped basic structure; and

areas between two adjacent ones of the frames in each case and the lower edge region of the dome-shaped or cup-shaped basic structure comprise material-free apertures and have a substantially curved triangular form.

2. The component holder as claimed in claim 1, wherein the component receiving member is arranged at the top of the dome-shaped or cup-shaped basic structure at an outer side and faces in a direction away from the dome-shaped or cup-shaped basic structure which extends normally with respect to a plane which is defined by the lower edge region of the attachment element.

3. The component holder as claimed in claim 1, wherein the dome-shaped or cup-shaped basic structure is formed from four of the frames which are each offset by 90°.

4. The component holder as claimed in claim 1, wherein the attachment element is formed as an injection-molded element made of plastics material.

5. The component holder as claimed in claim 1, wherein the base portion comprises i) an injection molded plastics material, ii) a punched, deep drawn, and pressed metal, or iii) a metal component over-molded with plastics material.

6. The component holder as claimed in claim 1, wherein the base portion has in a base of the shell-shaped, circular basic shape a centrally arranged receiving opening for an adapter ring.

7. The component holder as claimed in claim 6, wherein the adapter ring comprises an insulating component which is insertable in a positive-locking manner in the receiving opening.

8. The component holder as claimed in claim 7, wherein the adapter ring is retained by a clamping fit in the receiving opening.

9. The component holder as claimed in claim 6, wherein in an assembled state of the base portion, the attachment element and the adapter ring, an inner space of the shell-shaped, circular basic shape of the base portion and an inner space of the dome-shaped basic structure form a common inner space.

10. The component holder as claimed in claim 1, wherein the component receiving member comprises a mandrel with a plurality of annular locking elements.

11. The component holder as claimed in claim 1, wherein the component receiving member is configured to be connected to a flexible, planar mat which comprises at least one of a thermal insulation, electrical insulation, or acoustic absorption layer.

* * * * *